United States Patent
Lin et al.

(10) Patent No.: US 10,207,706 B2
(45) Date of Patent: Feb. 19, 2019

(54) SYSTEM FOR DETECTING LANE LINE OF ROAD AND METHOD THEREOF

(71) Applicant: Automotive Research & Testing Center, Lugang, Changhua County (TW)

(72) Inventors: Hung-Pang Lin, Changhua County (TW); Ming-Fang Chang, Changhua County (TW); Li-You Hsu, Changhua County (TW)

(73) Assignee: Automotive Research & Testing Center, Changhua County (TW)

( * ) Notice: Subject to any disclaimer, the term of this patent is extended or adjusted under 35 U.S.C. 154(b) by 142 days.

(21) Appl. No.: 15/392,374

(22) Filed: Dec. 28, 2016

(65) Prior Publication Data

US 2018/0178785 A1    Jun. 28, 2018

(51) Int. Cl.
| | |
|---|---|
| *B60W 30/095* | (2012.01) |
| *B60W 30/12* | (2006.01) |
| *B60W 50/14* | (2012.01) |
| *G05D 1/02* | (2006.01) |
| *G06K 9/00* | (2006.01) |
| *G06K 9/32* | (2006.01) |
| *G06K 9/62* | (2006.01) |

(52) U.S. Cl.
CPC ........ *B60W 30/0956* (2013.01); *B60W 30/12* (2013.01); *B60W 50/14* (2013.01); *G05D 1/0234* (2013.01); *G06K 9/00798* (2013.01); *G06K 9/3233* (2013.01); *G06K 9/6206* (2013.01); *B60W 2050/146* (2013.01); *B60W 2510/20* (2013.01); *B60W 2520/28* (2013.01); *B60W 2550/22* (2013.01); *B60W 2600/00* (2013.01); *B60W 2720/24* (2013.01); *G05D 2201/0213* (2013.01)

(58) Field of Classification Search
CPC ........................ B60W 30/0956; G05D 1/0234
See application file for complete search history.

(56) References Cited

U.S. PATENT DOCUMENTS

2016/0046290 A1* 2/2016 Aharony ............ G06K 9/00798
                                                        701/41

* cited by examiner

*Primary Examiner* — Michael D Lang
(74) *Attorney, Agent, or Firm* — Muncy, Geissler, Olds & Lowe, P.C.

(57) ABSTRACT

A system for detecting a lane line of a road and a method thereof is disclosed. An image-retrieving device retrieves an image in front of a vehicle to generate a picture, and transmits the picture to a processing device. The processing device transforms one or two lane lines on the picture into a plurality of characteristic values, processes the characteristic values to generate one or two prediction lane lines, and uses them to dynamically predict and complete the lane lines, thereby forming a lane line prediction model. The processing device uses the lane line prediction model to determine whether the vehicle deviates, and transmits the picture and the lane line prediction model to a display device to display. When the vehicle deviates, the display device warns. The present invention can improve to recognize an unclear lane line, a single lane line and a far lane line.

9 Claims, 10 Drawing Sheets

SYSTEM FOR DETECTING LANE LINE OF ROAD AND METHOD THEREOF

BACKGROUND OF THE INVENTION

Field of the Invention

The present invention relates to a system for detecting a lane line of a road and a method thereof, particularly to a system for detecting a lane line of a road and a method thereof, which uses an algorithm and an image processing technology to predict lane lines of a road.

Description of the Related Art

With the popularization of vehicles, vehicles driving on a road easily form very heavy traffic, so as to cause potential dangers. Statistically, of all the traffic accidents, collision accidents of 51% are caused by deviating vehicles from lanes when drivers drive the vehicles. The frequent and serious traffic accidents are mostly caused by deviating vehicles from lanes.

As a result, many technologies and products related to vehicles are gradually developed, such as a lane departure warning (LDW) system, a lane keeping support (LKS) system, and a lane following system (LFS), which are used to improve driving safety and prevent from accidents. These systems require an algorithm to recognize lanes. In general, a method for recognizing lanes uses a vehicular camera to capture an image, and then uses a processor to fit characteristic points of all lanes in the image. However, the method is easily affected by noise points and unclear characteristic points at a far end. For example, one of two lanes of a road is unclear when damaged or shaded, whereby the processor cannot effectively establish a lane-fitting model. Alternatively, the lane at a far end in the image is unclear whereby the characteristic points thereof are difficultly recognized to achieve bad fitting effect.

To overcome the abovementioned problems, the present invention provides a system for detecting a lane line of a road and a method thereof, which cooperates with an algorithm to predict a complete lane line by using at least one lane line and characteristic point closer to the lane line in an image.

SUMMARY OF THE INVENTION

A primary objective of the present invention is to provide a system for detecting a lane line of a road and a method thereof, which effectively recognizes a lane line damaged or shaded by an object on a bad road and recognizes characteristic points of lane lines in a lower region of a picture to predict complete lane lines, thereby saving the recognition time. In this way, far lane lines difficultly recognized can be clearly formed to improve the precision of fitting far lane lines and the efficiency of an algorithm.

Another objective of the present invention is to provide a system for detecting a lane line of a road and a method thereof, which applies clear recognition of lane lines to lane departure, thereby improving the efficiency of a lane departure warning (LDW) system, a lane keeping support (LKS) system, and a lane following system (LFS), warns when a driver is distracted to deviate a vehicle and applies to an autonomous cruise system of a vehicle to achieve automatic driving.

To achieve the abovementioned objectives, the present invention provides a method for detecting a lane line of a road, which comprises: retrieving an image in front of a vehicle to generate a picture; obtaining a plurality of characteristic values transformed from one or two lane lines from bottom to top on the picture; processing the plurality of characteristic values to generate one or two prediction lane lines on the picture; and using the one or two prediction lane lines to dynamically predict and complete the one or two lane lines on the picture, thereby forming a lane line prediction model.

The present invention also provides a system for detecting a lane line of a road, which comprises at least one image-retrieving device retrieving an image in front of a vehicle to generate a picture. The image-retrieving device transmits the picture to a processing device. The processing device transforms one or two lane lines from bottom to top on the picture into a plurality of characteristic values, processes the plurality of characteristic values to generate one or two prediction lane lines on the picture, and uses the one or two prediction lane lines to dynamically predict and complete the one or two lane lines on the picture, thereby forming a lane line prediction model. The processing device uses the lane line prediction model to determine whether the vehicle deviates, and transmits the picture and the lane line prediction model to a display device. The display device can display the picture and the lane line prediction model. When the vehicle deviates, the display device warns.

In the step of processing the plurality of characteristic values to generate the one or two prediction lane lines on the picture, the prediction lane line is a straight line or a curve by determining whether variation of slopes formed by the plurality of characteristic values rapidly converges.

The picture establishes a plurality of point coordinates using a plurality of vertical axes and a plurality of horizontal axes interlaced. The picture is gray-scaled, binarized, denoised and characterized, so as to transform the one or two lane lines into the plurality of characteristic values, and then the plurality of characteristic values are obtained from the point coordinates corresponding to the one or two lane lines from bottom to top on the picture.

An equation is used to calculate the slopes formed by the plurality of characteristic values and the point coordinates corresponding to the plurality of characteristic values to generate the one or two prediction lane lines, thereby forming the lane line prediction model. Then, the lane line prediction model is used to select a region of interest (ROI) from the picture and a warning for lane deviation is generated.

Below, the embodiments are described in detail in cooperation with the drawings to make easily understood the technical contents, characteristics and accomplishments of the present invention.

DETAILED DESCRIPTION OF THE INVENTION

The present invention recognizes curvature of lane lines and predicts a lane line model. That is to say, the present invention uses a single lane line to perform lane line detection, thereby achieving image recognition of a lane departure warning (LDW) system, a lane keeping support (LKS) system, and a lane following system (LFS), assistant driving and autonomous cruise driving.

Figure 1:
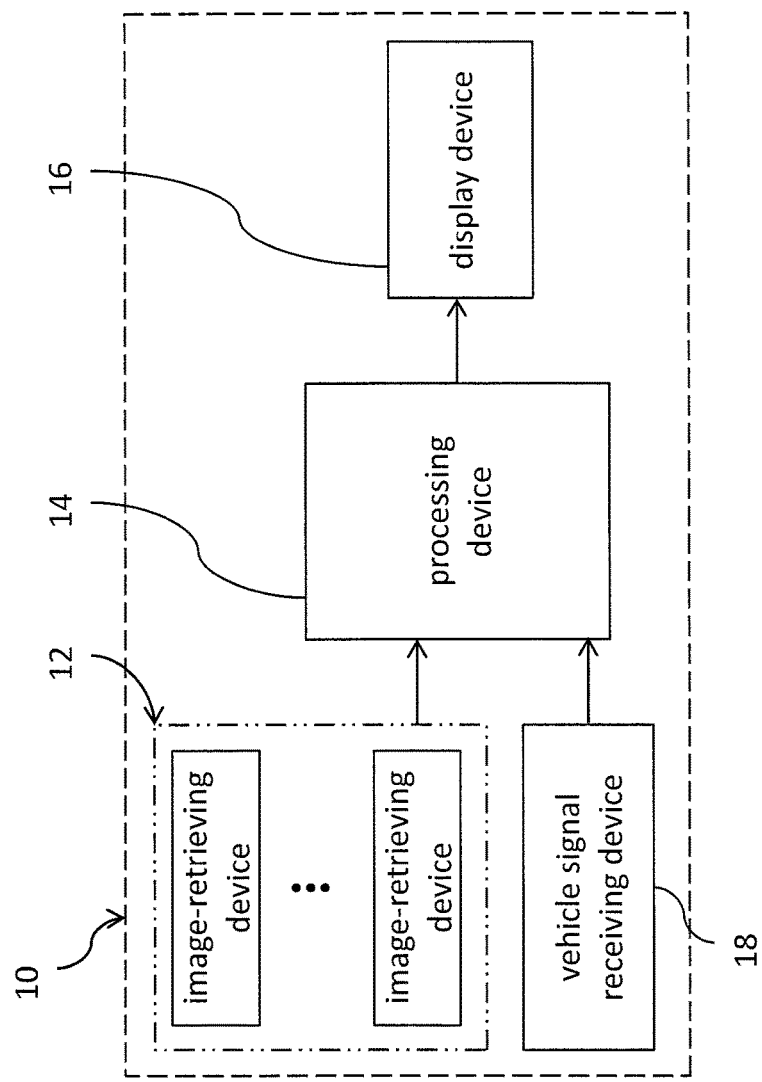
FIG. 1 is a block diagram schematically showing a system for detecting a lane line of a road according to an embodiment of the present invention.

Refer to FIG. 1. A system 10 for detecting a lane line of a road is installed on a vehicle and comprises at least one image-retrieving device 12, a processing device 14, a display device 16 and a vehicle signal receiving device 18. The processing device 14 is signally connected with at least one image-retrieving device 12, the display device 16 and the vehicle signal receiving device 18. In the embodiment, the image-retrieving device 12 is a vehicular camera, and the processing device 14 is a microcontroller unit (MCU), and the display device 16 is a liquid-crystal (LC) display, and the vehicle signal receiving device 18 is an adapter. The signal connection, for example, but not limited to wired signal connection or wireless signal connection, is used. The present invention is exemplified by the abovementioned description, but the present invention is not limited thereto.

Figure 2:
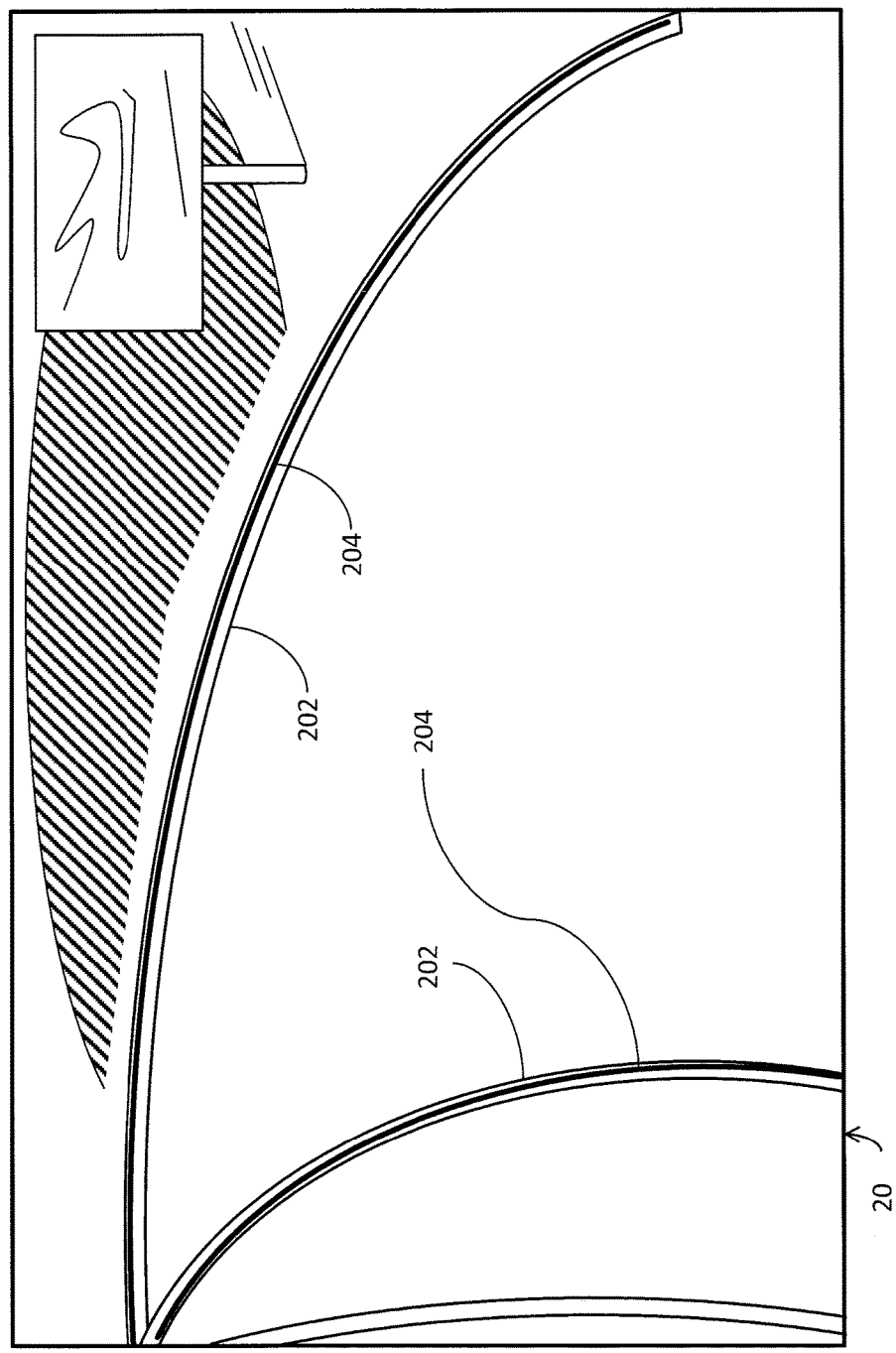
FIG. 2 is a diagram schematically showing a picture according to an embodiment of the present invention.

Refer to FIG. 2. Continuing from the abovementioned description, the image-retrieving device 12 retrieves an image in front of a vehicle to generate a picture 20. The image-retrieving device 12 transmits the picture 20 to the processing device 14. The processing device 14 transforms one or two lane lines 202 from bottom to top on the picture 20 into a plurality of characteristic values. The processing device 14 processes the characteristic values to generate one or two prediction lane lines 204 on the picture 20, and uses the one or two prediction lane lines 204 to dynamically predict and complete the one or two lane lines 202 on the picture 20, thereby forming a lane line prediction model. The vehicle signal receiving device 18 receives a vehicle speed signal, a steering wheel rotation signal or a rotational speed signal from the vehicle, and then transmits it to the processing device 14. The processing device 14 uses the lane line prediction model and either of the vehicle speed signal, the steering wheel rotation signal or the rotational speed signal to determine whether the vehicle deviates. Simultaneously, the processing device 14 transmits the picture 20 and the lane line prediction model to the display device 16, whereby the display device 16 displays the picture 20 and the lane line prediction model. When the processing device 14 determines that the vehicle deviates, the display device 16 warns. For example, the display device 16 displays a warning message or generates a warning sound.

Figure 3:
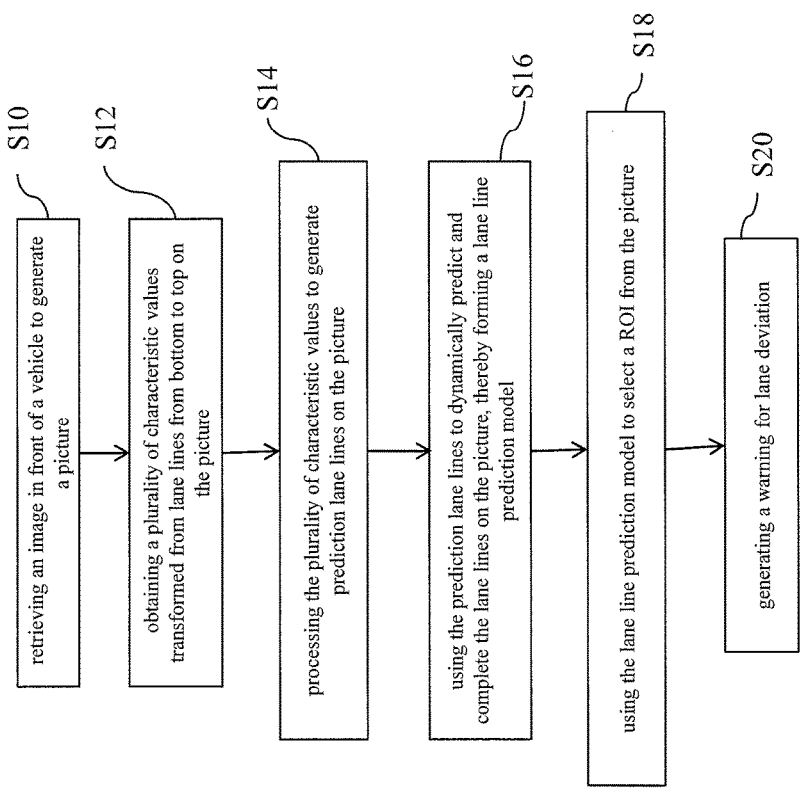
FIG. 3 is a flowchart of a method for detecting a lane line of a road according to an embodiment of the present invention.
Figure 4:
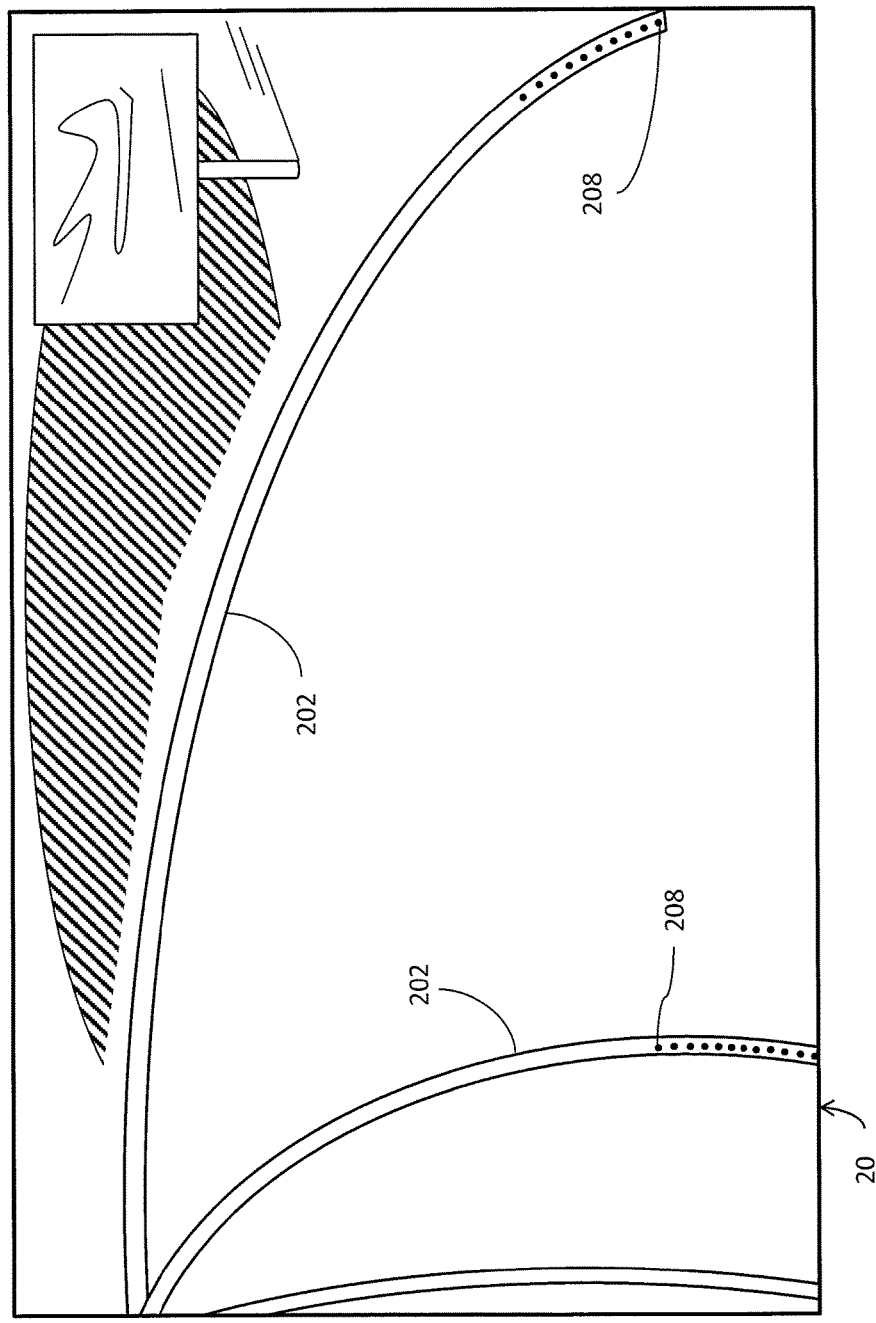
FIG. 4 is a diagram schematically showing characteristic values transformed from lane lines on a picture according to an embodiment of the present invention.
Figure 5:
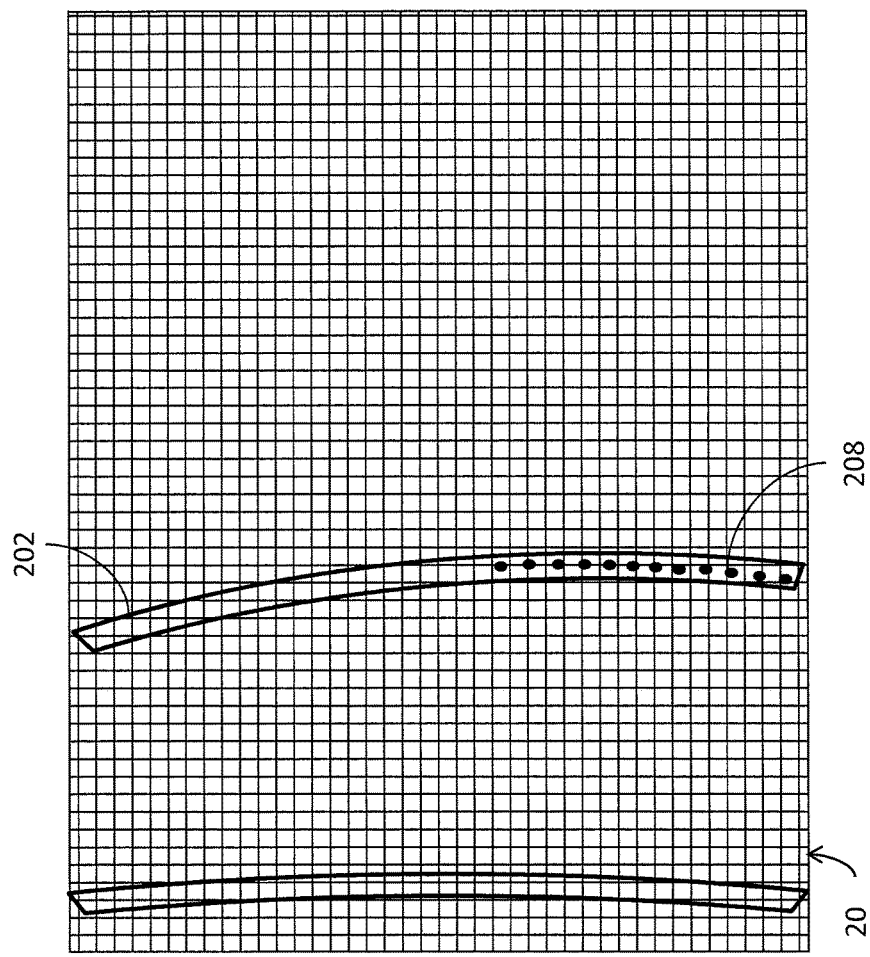
FIG. 5 is a diagram schematically showing coordinate axes including horizontal axes and vertical axes on the picture according to an embodiment of the present invention.
Figure 6:
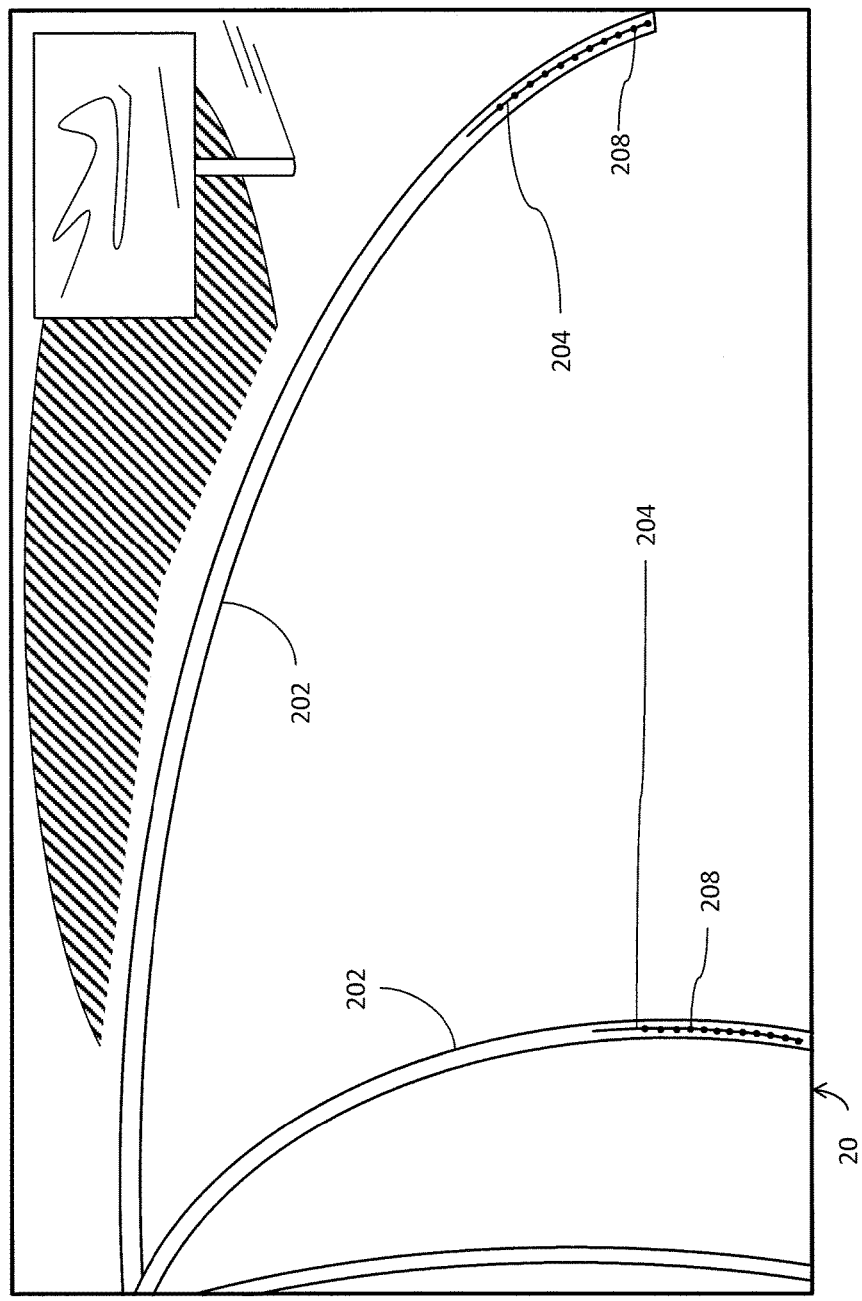
FIG. 6 is a diagram schematically showing prediction lane lines generated by the characteristic values according to an embodiment of the present invention.

In order to understand how the present invention recognizes and predicts lane lines, refer to FIG. 1, FIG. 3 and FIG. 4. The method for detecting a lane line of a road of the present invention is introduced as below. Take one image-retrieving device 12 for example. Firstly, in Step S10, the image-retrieving device 12 retrieves the image in front of the vehicle to generate the picture 20. Then, in Step S12, the processing device 14 sequentially obtains a plurality of characteristic values 208 transformed from one or two lane lines 202 from bottom to top on the picture 20. The embodiment exemplifies a normal road. Thus, the plurality of characteristic values 208 is transformed from two lane lines 202. Refer to FIG. 5. The processing device 14 partitions the picture 20 by a plurality of vertical axes and a plurality of horizontal axes interlaced, and uses the plurality of vertical axes and the plurality of horizontal axes to establish a plurality of point coordinates on the picture 20. Then, the processing device 14 transforms the picture 20 into the plurality of characteristic values 208. For example, color of each pixel of the picture 20 is gray-scaled. Then, the gray-scaled picture is binarized and divided into the pixels larger than and less than a gray-scaled threshold. Then, the picture 20 is de-noised to eliminate unnecessary noise points. Finally, the lane lines 202 are characterized whereby the lane lines 202 are transformed into the plurality of characteristic values 208. Simultaneously, the plurality of characteristic values 208 is obtained from the point coordinates corresponding to the two lane lines 202 from bottom to top on the picture 20.

Figure 7:
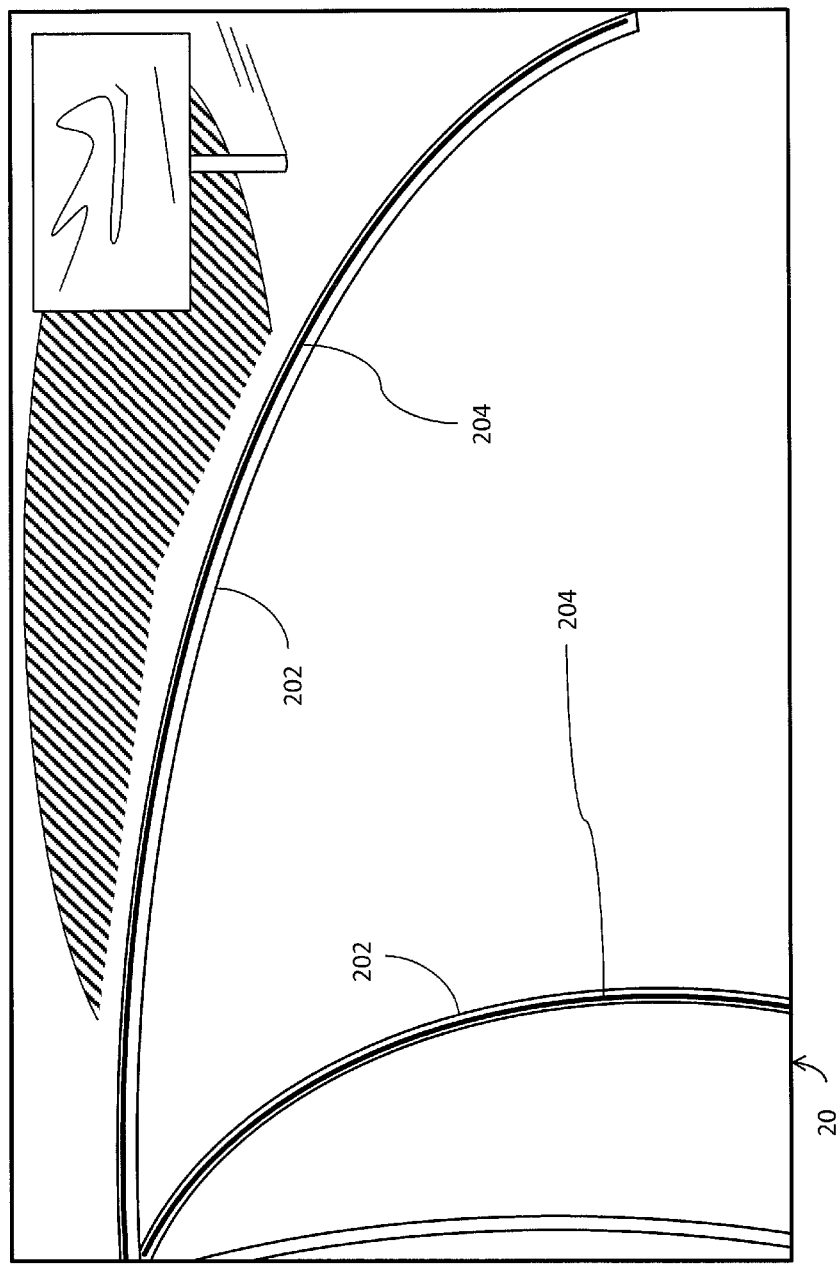
FIG. 7 is a diagram schematically showing lane lines predicted and completed by the prediction lane lines according to an embodiment of the present invention.

Continuing from the abovementioned paragraph, refer to FIG. 1, FIG. 3, FIG. 4 and FIG. 6. In Step S14, the characteristic values 208 obtained by the processing device 14 are compact and arranged into a line. Thus, the processing device 14 uses the characteristic values 208, slopes formed by the characteristic values 208 and the point coordinates corresponding to the characteristic values 208 to generate two prediction lane lines 204 on the picture 20 in cooperation with an equation (1).

$$y = ax^2 + bx + c \tag{1}$$

Wherein y represents the point coordinates of the vertical axes, and x represents the point coordinates of the horizontal axes, and a represents curvature of the prediction lane line 204, and b represents the slopes formed by the plurality of characteristic values 208, and c represents displacement. Refer to FIG. 7. The two prediction lane lines 204 are generated according to equation (1). In Step S16, the processing device 14 uses the two prediction lane lines 204 to predict two practical lane lines 202, and detect and display the lane lines 202 far away on the picture 20. The two prediction lane lines 204 are formed into a lane line prediction model on the picture 20. The two prediction lane lines 204 are used to dynamically predict two lane lines 202 in front of the vehicle according to the move of the vehicle. In Step S18, after using the two prediction lane lines 204 to form the lane line prediction model, the processing device 14 cooperates with the dynamic lane line prediction model to select a region of interest (ROI) on the picture 20. The position and range of the ROI are adaptable according to requirement of a user. In Step S20, the processing device 14 uses the dynamic lane line prediction model and either of a vehicle speed signal, a steering wheel rotation signal or a rotational speed signal to generate a warning for lane deviation.

Figure 8:
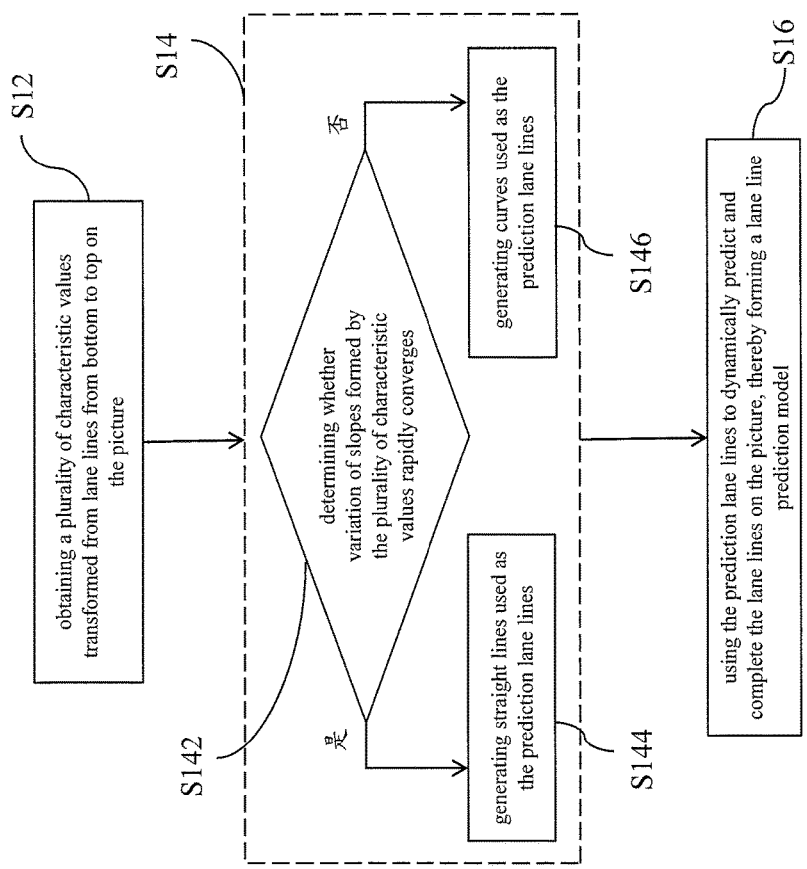
FIG. 8 is a flowchart of Step S14 of determining variation of slopes formed by the characteristic values in FIG. 3.
Figure 9:
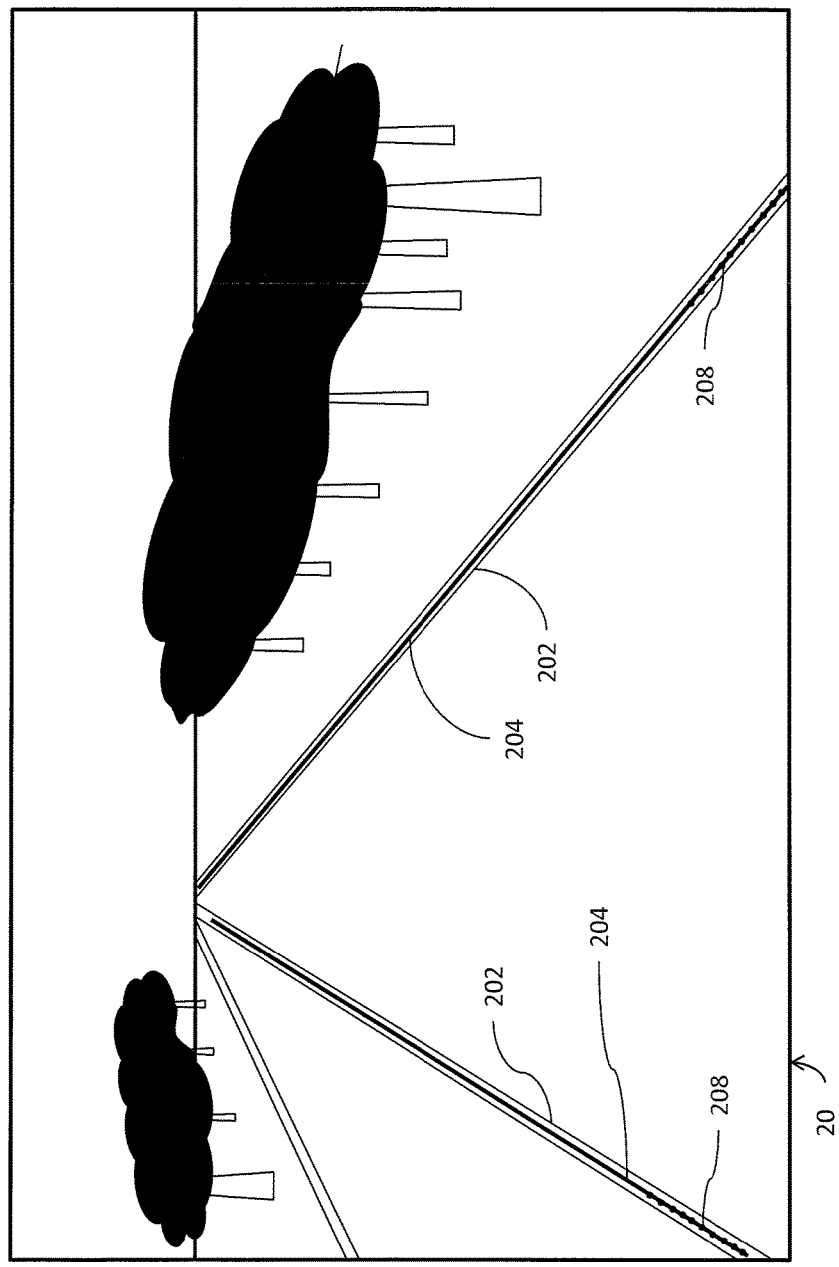
FIG. 9 is a diagram schematically showing straight lines used as the prediction lane lines according to an embodiment of the present invention.

In the abovementioned embodiment, the road detected by equation (1) is a curve road. In general, the practical roads include curve roads and straight roads. Below is an introduction to explain how the present invention rapidly determines two different roads. Refer to FIG. 1, FIG. 8 and FIG.

9. Step S14 further comprises a step of determining the lane lines are curves or straight lines. In Step S142, the processing device 14 determines whether variation of slopes formed by the characteristic values 208 rapidly converges. The rapid convergence indicates that the slope does not vary anymore when the variation of the slopes is larger than a threshold. As a result, the process proceeds to the next step when the variation of the slopes rapidly converges. In Step S144, the two prediction lane lines 204 on the picture 20 are straight lines since the slopes formed by the characteristic values 208 does not vary but rapidly converges. In Step S142, when the variation of the slopes formed by the characteristic values 208 does not rapidly converge and immediately exceed a threshold, the process proceeds to Step S146. For example, the threshold corresponds to the far position that the variation converges on the picture 20. Refer to FIG. 7. In Step S146, the lane lines 202 far away from the vehicle converge to form horizontal and straight lines that cannot vary anymore on the picture 20. Thus, the prediction lane lines 204 are curves and converge toward an upper region of the picture 20.

Figure 10:
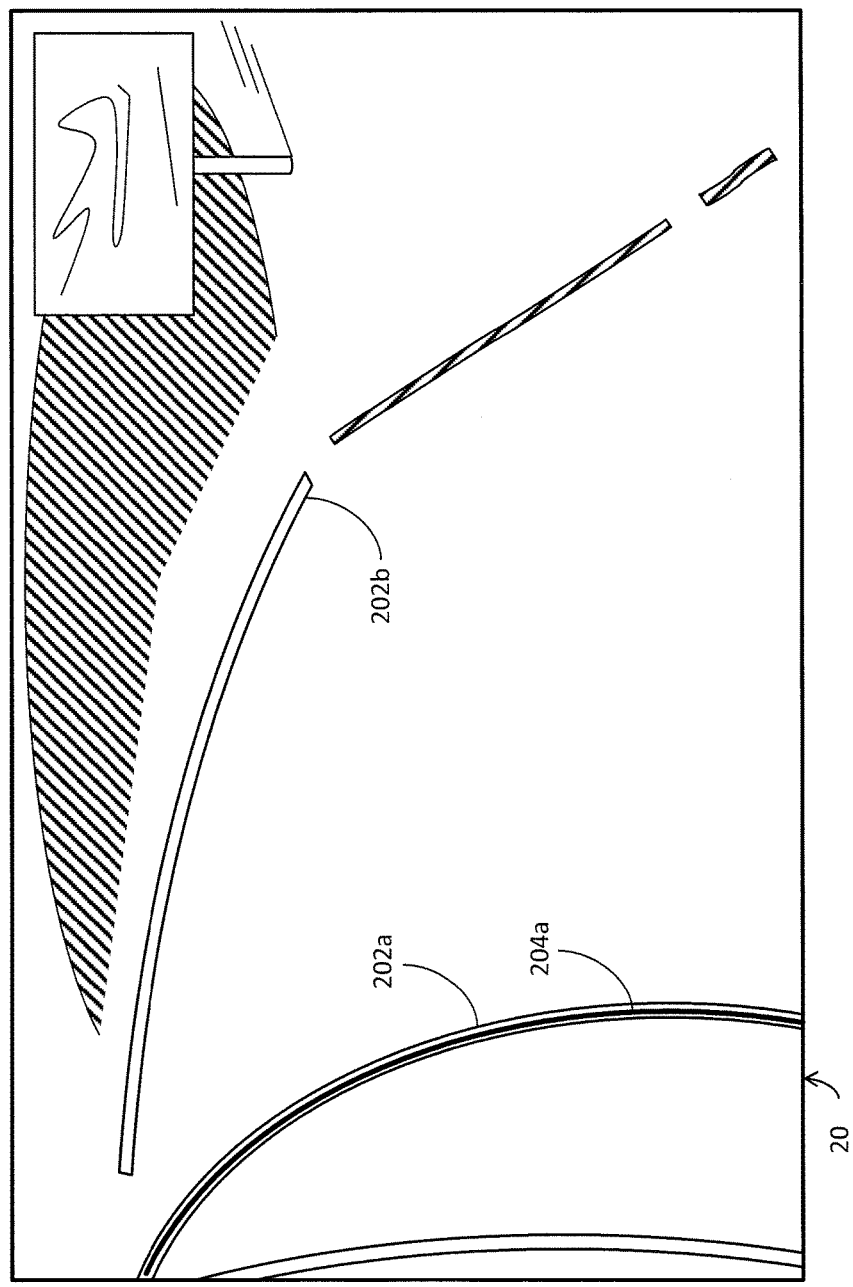
FIG. 10 is a diagram schematically showing a single lane line according to an embodiment of the present invention.

The abovementioned embodiment exemplifies a normal road. Besides, there is also an abnormal road in front of the vehicle. Refer to FIG. 10. If a part of a right lane line 202b retrieved by the image-retrieving device 12 is abnormal, the processing device 14 still retrieves characteristic values according to a left lane line 202a to generate a prediction lane line 204a, and uses the prediction lane line 204a to dynamically predict and complete the lane line 202a on the picture 20, thereby forming a lane line prediction model.

Therefore, the present invention uses one or two lane lines to generate prediction lane lines on the picture and form the lane line prediction model. The present invention does not malfunction due to the existence of a single lane line. The system for detecting a lane line of a road and a method thereof of the present invention are used to generate a warning for lane deviation. In addition, the present invention can apply to a LDW system, a LKS system, and a LFS to effectively ensure driving safety of a driver, and uses a plurality of characteristic values in the lowest region of the picture to predict complete lane lines. The present invention is not limited by the amount of characteristic points. The present invention uses 10~15 characteristic points to determine that the lane line is a straight line or a curve, and uses 30~50 characteristic points to generate the prediction lane line and predict the complete lane line. In a conventional technology, the characteristic values of lane lines on the whole picture are analyzed. Consequently, unlike the conventional technology, the present invention not only saves the calculation time but also completes the lane lines to overcome the problem with unclear lane lines far away on the picture. The prediction lane lines are generated by the characteristic values can show the far lane lines, whereby the driver has more response time in driving. Alternatively, when the vehicle autonomously cruises, the vehicle can greatly improve the efficiency of an autonomous driving system. Furthermore, the present invention predicts a single lane line of a road when detecting the single lane line as opposed to the conventional technology requiring retrieving the whole picture and two lane lines. When lane lines are unclear, damaged or shaded, the present invention generates a warning for lane deviation depending on a single lane line, thereby ensuring the safety of the driver and others.

The embodiments described above are only to exemplify the present invention but not to limit the scope of the present invention. Therefore, any equivalent modification or variation according to the shapes, structures, features, or spirit disclosed by the present invention is to be also included within the scope of the present invention.

What is claimed is:

1. A method for detecting lane line of road comprising:
   retrieving an image in front of a vehicle to generate a picture;
   obtaining a plurality of characteristic values transformed from one or two lane lines from bottom to top on said picture;
   processing said plurality of characteristic values to generate one or two prediction lane lines on said picture; and
   using said one or two prediction lane lines to dynamically predict and complete said one or two lane lines on said picture, thereby forming a lane line prediction model;
   wherein said picture establishes a plurality of point coordinates using a plurality of vertical axes and a plurality of horizontal axes interlaced;
   wherein said one or two prediction lane lines are generated using slopes fanned by said plurality of characteristic values and said point coordinates corresponding to said plurality of characteristic values;
   wherein said one or two prediction lane lines are expressed by $y=ax^2+bx+c$, wherein y represents said point coordinates of said vertical axes, and x represents said point coordinates of said horizontal axes, and a represents curvature of said prediction lane line, and b represents said slopes formed by said plurality of characteristic values, and c represents displacement.

2. The method for detecting lane line of road according to claim 1, wherein said step of processing said plurality of characteristic values to generate said one or two prediction lane lines on said picture further comprises:
   determining whether variation of slopes formed by said plurality of characteristic values rapidly converges:
   if yes, generating one or two straight lines used as said one or two prediction lane lines on said picture; and
   if no, generating one or two curves used as said one or two prediction lane lines on said picture.

3. The method for detecting lane line of road according to claim 1 wherein said picture is gray-scaled, binarized, de-noised and characterized, so as to transform said one or two lane lines into said plurality of characteristic values, and then said plurality of characteristic values are obtained from said point coordinates corresponding to said one or two lane lines from bottom to top on said picture.

4. The method for detecting lane line of road according to claim 1, further comprising:
   using said lane line prediction model to select a region of interest (ROI) from said picture; and
   generating a warning for lane deviation.

5. A system for detecting lane line of road comprising:
   at least one image-retrieving device retrieving an image in front of a vehicle to generate a picture; and
   a processing device signally connected with said at least one image-retrieving device, receiving said picture, transforming one or two lane lines from bottom to top on said picture into a plurality of characteristic values, processing said plurality of characteristic values to generate one or two prediction lane lines on said picture, and using said one or two prediction lane lines to dynamically predict and complete said one or two lane lines on said picture, thereby forming a lane line prediction model;
   wherein said picture establishes a plurality of point coordinates using a plurality of vertical axes and a plurality of horizontal axes interlaced;

wherein said processing device generates said one or two prediction lane lines using slopes formed by said plurality of characteristic values and said point coordinates corresponding to said plurality of characteristic values;

wherein said one or two prediction lane lines are expressed by $y=ax^2+bx+c$, wherein y represents said point coordinates of said vertical axes, and x represents said point coordinates of said horizontal axes, and a represents curvature of said prediction lane line, and b represents said slopes formed by said plurality of characteristic values, and c represents displacement.

6. The system for detecting lane line of road according to claim 5, further comprising a vehicle signal receiving device signally connected with said processing device, receiving a vehicle speed signal, a steering wheel rotation signal or a rotational speed signal, and transmitting it to said processing device whereby said processing device uses said lane line prediction model to determine whether said vehicle deviates.

7. The system for detecting lane line of road according to claim 5, further comprising a display device signally connected with said processing device, and receiving and displaying said picture and said lane line prediction model transmitted by said processing device, and when said vehicle deviates, said display device warns.

8. The system for detecting lane line of road according to claim 7, wherein said processing device uses said lane line prediction model to select a region of interest (ROI) from said picture, and said display device displays said ROI.

9. The system for detecting lane line of road according to claim 5, wherein said processing device gray-scaled, binarizes, de-noises and characterizes said picture, so as to transform said one or two lane lines into said plurality of characteristic values, and obtains said plurality of characteristic values from said point coordinates corresponding to said one or two lane lines from bottom to top on said picture.

* * * * *